United States Patent
Lee et al.

(10) Patent No.: US 7,568,827 B2
(45) Date of Patent: Aug. 4, 2009

(54) LIGHT GUIDE MEMBER AND BACKLIGHT UNIT INCLUDING LIGHT GUIDE MEMBER

(75) Inventors: Dong Ho Lee, Ulsan-si (KR); Won Ki Cho, Yangsan-si (KR); Jang Hwan Hwang, Daejeon-si (KR)

(73) Assignee: Samsung Mobile Display Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 11/727,054

(22) Filed: Mar. 23, 2007

(65) Prior Publication Data

US 2008/0008434 A1 Jan. 10, 2008

(30) Foreign Application Priority Data

Jul. 4, 2006 (KR) ................... 10-2006-0062727

(51) Int. Cl.
*F21V 7/04* (2006.01)
(52) U.S. Cl. .................. 362/620; 349/62; 349/63; 349/64; 349/65; 385/146
(58) Field of Classification Search .............. None
See application file for complete search history.

(56) References Cited

U.S. PATENT DOCUMENTS

| | | | |
|---|---|---|---|
| 5,730,518 A * | 3/1998 | Kashima et al. | 362/619 |
| 6,474,827 B2 * | 11/2002 | Shinohara et al. | 362/607 |
| 6,490,018 B1 | 12/2002 | Taira | |
| 6,981,792 B2 * | 1/2006 | Nagakubo et al. | 362/600 |
| 7,162,139 B2 | 1/2007 | Matsui et al. | |
| 2002/0080598 A1 * | 6/2002 | Parker et al. | 362/31 |
| 2003/0169386 A1 | 9/2003 | Goto et al. | |
| 2004/0125592 A1 | 7/2004 | Nagakubo et al. | |
| 2005/0099815 A1 | 5/2005 | Kim et al. | |
| 2005/0174804 A1 | 8/2005 | Blanc | |

FOREIGN PATENT DOCUMENTS

| | | |
|---|---|---|
| EP | 1 522 881 A1 | 4/2005 |
| JP | 2004-187620 | 7/2004 |
| JP | 2005-142164 | 6/2005 |
| KR | 2001-058166 | 7/2001 |
| KR | 10-2005-0007828 | 1/2005 |
| KR | 10-2005-0033481 A | 4/2005 |
| WO | WO 03/050448 A1 | 6/2003 |
| WO | WO 03/085428 A1 | 10/2003 |
| WO | WO 2006/054654 A1 | 5/2006 |

* cited by examiner

*Primary Examiner*—Sung H Pak
*Assistant Examiner*—Chad H Smith
(74) *Attorney, Agent, or Firm*—Lee & Morse, P.C.

(57) ABSTRACT

A light guide member for guiding light incident thereon from a light source, the light guide member including a plurality of the first grooves extending along a first direction on a first side of the light guide member, a plurality of second grooves extending along a second direction on the first side of the light guide member, the first direction may cross the second direction such that the first grooves and the second grooves may form a matrix pattern on the first side of the light guide member, wherein a polygonal shaped projection is formed between every two adjacent ones of the second grooves and a corresponding two adjacent ones of the first grooves.

17 Claims, 4 Drawing Sheets

LIGHT GUIDE MEMBER AND BACKLIGHT UNIT INCLUDING LIGHT GUIDE MEMBER

BACKGROUND OF THE INVENTION

1. Field of the Invention

The invention relates to a light guide member and a backlight unit including a light guide member. More particularly, the invention relates to a light guide member for guiding light traveling therein and providing uniformly distributed light, and a backlight unit employing such a light guide member.

2. Description of the Related Art

A light guide member may be employed, e.g., by an illumination device of a display device, to receive light from a light source of the illumination device, and guide the received light so as to provide light having a uniform luminance distribution to a display panel of the display device. For example, a flat panel display device, e.g., a liquid crystal display (LCD), may include an illumination device, e.g., a backlight unit (BLU), which may include a light guide member.

There is a demand for improved display devices in, e.g., the information and communication industries. More particularly, e.g., higher resolution, lighter, thinner, and/or less power consuming display devices are desired. One possible approach for developing such improved display devices is to provide thinner, lighter BLUs and/or improved light guide members capable of providing light having a more uniform luminance distribution.

For example, one type of flat panel display that is widely used today is thin film transistor-liquid crystal displays (TFT-LCDs). Such TFT-LCDs may include a LCD panel in which liquid crystal is provided between two substrates, a BLU as an illumination device positioned in a lower portion of the LCD panel, and a LCD drive IC (LDI) for driving the LCD panel. The BLU unit may include, e.g., a light source, a light guide member, and an optical sheet including a diffusion sheet and a prism sheet.

The light source may supply non-uniformly distributed linear light to the light guide member. Generally, the light guide member is to modify the non-uniformly distributed linear light and output planar light having a uniform optical distribution. However, conventional light guide members fall short of outputting uniformly distributed linear light. For example, portions of the light guide member arranged between, and in close proximity to, light sources of the illumination device may provide less light, i.e., appear darker, than portions of the light guide member arranged substantially along a zero-degree radiation angle of the respective light source.

More particularly, in general, as the radiation angle of light from the light source increases, an intensity of the radiated light decreases. The diffusion of light is also generally weak at a portion of a light guide member close to the light source. Thus, at portions of the light guide member receiving light from the light source via relatively larger radiation angles and/or beyond a radiation angle of the light, the intensity of light output from the light guide member may not have a uniform luminance distribution. As a result of such non-uniformity, a luminance distribution of light from the light guide member may include a bright line, bright area and/or dark area, e.g., close to the light source, i.e., a bright line/area effect. Such a bright line/area effect may be particularly prominent at portions of the light guide member that do not overlap with or are not aligned with light sources of a light source unit. When, light having a non-uniform luminance distribution is provided to a display device, image quality of the display device may be hindered.

In view of such shortcomings of the light guide member, a BLU employing such light guide members may include a plurality of optical sheets, e.g., a diffusion sheet and a prism sheet, in an attempt to provide light having a more uniformly distributed luminance to the display device. However, having to provide additional optical sheets may increase, e.g., the cost, weight and/or size of the BLU.

SUMMARY OF THE INVENTION

It is an object of the invention to provide a light guide member and a backlight unit including such a light guide member, which substantially overcome one or more of the problems due to limitations and disadvantages of the related art.

It is therefore a feature of embodiments of the invention to provide a light guide member capable of guiding light to output light having a more uniform luminance distribution relative to conventional light guide members.

It is therefore a separate feature of embodiments of the invention to provide a BLU employing only a prism sheet as an optical member.

It is therefore a separate feature of embodiments of the invention to provide a light guide member capable of guiding light to output light having an entirely uniform luminous distribution.

It is therefore a separate feature of embodiments of the invention to provide a thinner and/or lighter BLU.

At least one of the above and other features and advantages of the invention may be realized by providing a light guide member for guiding light incident thereon from a light source, the light guide member including a plurality of the first grooves extending along a first direction on a first side of the light guide member and a plurality of second grooves extending along a second direction on the first side of the light guide member, the first direction being different from the second direction.

The light guide member may include a plurality of third grooves extending along a third direction on a second side of the light guide member, wherein the third direction may be different from the second direction. A vertical angle formed by two inner sides of the third grooves may be about 85° to about 120°. A vertical angle formed by two inner sides the first grooves may be about 130° to about 150°. One of the two inner sides of the first grooves may be longer than the other of the two inner sides. An angle formed by an inner side of each of the first grooves that is closer to the light source and a plane extending along the first and second directions may be about 1° to about 3°. A vertical angle formed by two inner sides of the second grooves may be about 120° to about 160°. The first direction may be orthogonal to the second direction. The second direction may be parallel with the third direction.

At least one of the above and other features and advantages of the invention may be separately realized by providing a light guide member for guiding light incident thereon from a light source, the light guide member including a plurality of first grooves extending along a first direction on a first side of the light guide member, a plurality of second grooves extending along a second direction on the first side of the light guide member, the first direction crossing the second direction such that the first grooves and the second grooves form a matrix pattern defining a plurality of same shaped regions on the first side of the light guide member, wherein the plurality of substantially same shaped regions may include polygonal shaped projections formed between corresponding ones of the first grooves and second grooves.

The first direction may be perpendicular to the second direction. The first direction may be substantially parallel to a zero degree radiation angle of light emitted from the light source. A vertical angle formed by two inner sides of the first grooves may be about 130° to about 150°. An angle formed by the inner side closer to the light source and a plane extending along the first and second directions may be about 1° to about 3°. A vertical angle formed by two inner sides of the second grooves may be about 120° to about 160°. The light guide member may include a plurality of third grooves on a second side of the light guide member, wherein the second side may oppose the first side and the third grooves may extend along a third direction. The polygonal shape projections may be pyramid-like shaped projections.

At least one of the above and other features and advantages of the invention may be separately realized by providing a backlight unit (BLU) employable by a display device including a display panel, the backlight unit including a light source, an optical member, and a light guide member arranged to receive light from the light source and provide the guided light to the optical member, the light guide member including a plurality of the first grooves extending along a first direction on a first side of the light guide member, a plurality of second grooves extending along a second direction on a second side of the light guide member, the second direction being different from the first direction, and a plurality of third grooves extending along a third direction on the second side of the light guide member, the third direction being different from the second direction.

The light source may include at least one of a cold cathode fluorescent tube and a LED. The optical member may only include a prism sheet. The optical member may not include a diffusion sheet.

BRIEF DESCRIPTION OF THE DRAWINGS

The above and other features and advantages of the invention will become more apparent to those of ordinary skill in the art by describing in detail exemplary embodiments thereof with reference to the attached drawings in which.

DETAILED DESCRIPTION OF THE INVENTION

Figure 1:
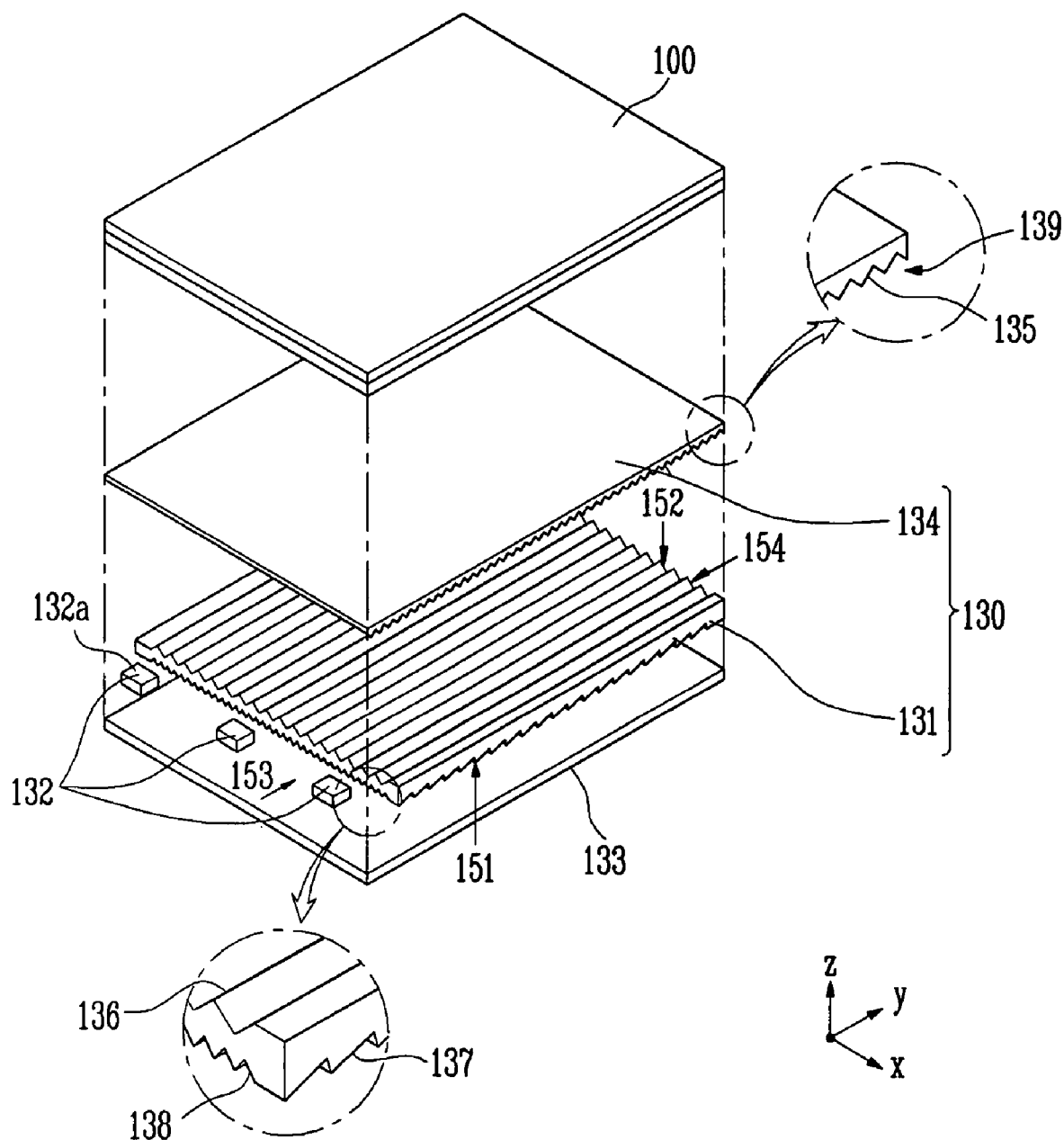
FIG. 1 illustrates an exploded perspective view of parts of an exemplary liquid crystal display (LCD) device, as an exemplary device, employing an exemplary embodiment of a backlight and an exemplary embodiment of a light guiding member according to one or more aspects of the invention.

Korean Patent Application No. 10-2006-0062727, filed on Jul. 4, 2006, in the Korean Intellectual Property Office, and entitled: Light Guided Plate and Backlight Unit Having the Same," is incorporated by reference herein in its entirety.

The invention will now be described more fully hereinafter with reference to the accompanying drawings, in which exemplary embodiments of the invention are illustrated. The invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout. In the following description, references made to "first," "second," etc. merely serve to identify different elements and/or features of different elements and, unless specified otherwise, the features may or may not have the same values.

FIG. 1 illustrates an exploded perspective view of parts of an exemplary liquid crystal display (LCD) device, as an exemplary device, employing an exemplary embodiment of a backlight and an exemplary embodiment of a light guiding member according to one or more aspects of the invention.

Referring to FIG. 1, a LCD device may include a LCD panel 100 and a backlight unit (BLU) 130. The BLU 130 may provide light to the LCD panel 100 such that images may be displayed on the LCD panel 100.

The LCD panel 100 may include two substrates disposed opposite each other, a liquid crystal layer provided between the two substrates, and a pixel region (not shown) defined by, e.g., a plurality of gate lines and data lines arranged on the substrates in, e.g., a matrix-type manner. A thin film transistor and a pixel electrode may be formed at respective portions of one of the substrates corresponding to intersecting portions of the gate lines and data lines formed thereon (not shown). Each pixel electrode may be connected to the respective thin film transistor, and each thin film transistor may control signals respectively supplied to the respective pixel(s). A color filter (not shown) and a common electrode (not shown) may be formed on the other of the substrates. A polarizing film (not shown) may be provided on an outer side of each of the substrates.

The BLU 130 may include a light guide member 131, a light source unit 132, an optical member 134, and a reflective member 133. The first side 151, e.g., reflective side, of the light guide member 131 may face the reflective member 133 of the BLU 130, and the second side 152, e.g., exit side, of the light guide member 131 may face the optical member 134. The light source unit 132 may supply light to the light guide member 131. The light guide member 131 may change a distribution of light provided from the light source unit 132. The reflective member 133 may reflect light back toward the LCD panel 100.

The light guide member 131 may change a distribution of light received, e.g., from one or more light sources 132a of a light source unit 132. More particularly, the light guide member 131 may change a distribution of light concentrated on a plurality of small areas thereof, and may, thereby, provide uniform and/or substantially uniform light over a relatively larger area corresponding to the plurality of small areas and/or an entire area of, e.g., the second side 152 of the light guide member 131.

The light guide member 131 may have a thin-plate-like shape, e.g., cuboid. The light guide member 131 may include, e.g., transparent resin such as, e.g., acryl or polycarbonate, etc.

The light guide member 131 may include a first side 151, a second side 152, a third side 153, and a fourth side 154. The first side 151 and the second side 152 may oppose each other, and the third side 153 and the fourth side 154 may oppose each other. More particularly, the third side 153 and the fourth side 154 may extend between and connect respective portions of the first side 151 and the second side 152 together.

The light source unit 132 may be disposed on one or more sides, e.g., the third side 153 of the light guide member 131. A point light source, such as a light emitting diode (LED) light-emitting white light, may be used as the light source 132a, and one or more light sources 132a may be arranged depending on, e.g., a size of the light guide member 131. The light source 132a may be, e.g., a cold cathode fluorescent lamp (CCFL) and/or an LED. CCFLs may generally be employed for larger-sized display devices, and LEDs may generally be employed for smaller-sized display devices.

In the exemplary embodiment illustrated in FIG. 1, the light sources 132a are arranged on a single side, i.e., the third side 153, of the light guide member 131. That is, in some embodiments of the invention, the light guide member 131 may only receive light from one side, e.g., the third side 153 of the light guide member 131. However, embodiments of the invention are not limited to such an arrangement.

The optical member 134 may collect and reflect the light having a uniform luminance distribution, help enhance brightness of the display device and/or only allow light with a predetermined incident angle to pass through. For example, the optical member 134 may include a prism sheet that only allows substantially vertical direction, e.g., z-direction, light to pass through, while light having other incident angles may be reflected toward the reflective member 133 before being reflected back again toward the optical member 134, until the light vertically passes through the optical member 134 toward the LCD panel 100.

The optical member 134 may include a prism sheet. In embodiments of the invention, the optical member 134 may only include a prism sheet. In other embodiments of the invention, the optical member 134 may include more than a single prism sheet, but may not include a diffusion sheet. Referring to FIG. 1, the optical member 134 may include one or more grooves 135 formed on a side 139 facing the light guide member 131. The prism sheet of the optical member 134 may help improve the vertical incident capability by diffusing and collecting light incident from the light guide member 131 in a direction of the LCD panel 100.

The light guide member may include first grooves 136, second grooves 137 and/or third grooves 138. Referring to FIG. 1 in the first exemplary embodiment of the light guide member 131 employing one or more aspects of the invention, a plurality of the first grooves 136 may be formed on the second side 152 of the light guide member 131. The first grooves 136 may extend, e.g., along a second direction, e.g., y-direction, which may be parallel to a zero-degree radiation angle of light emitted from the light sources 132a.

Figure 2A:
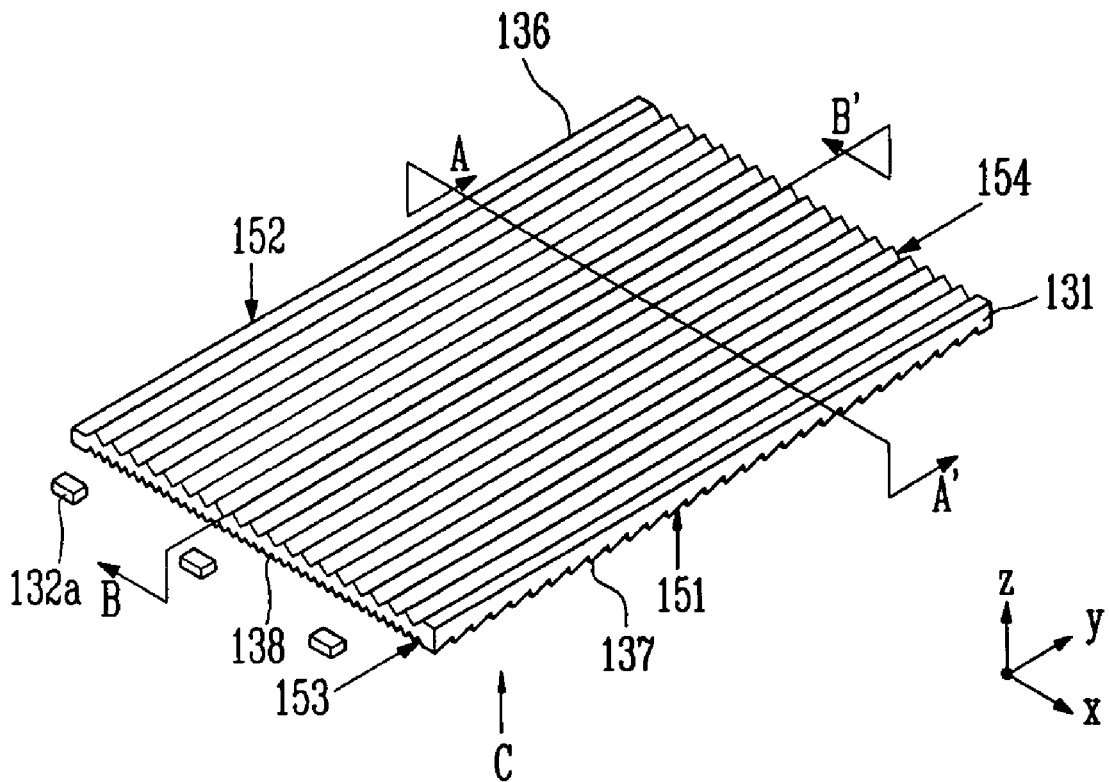
FIG. 2A illustrates a top-side perspective view of an exemplary embodiment of a light guide member employing one or more aspects of the invention.
Figure 2B:
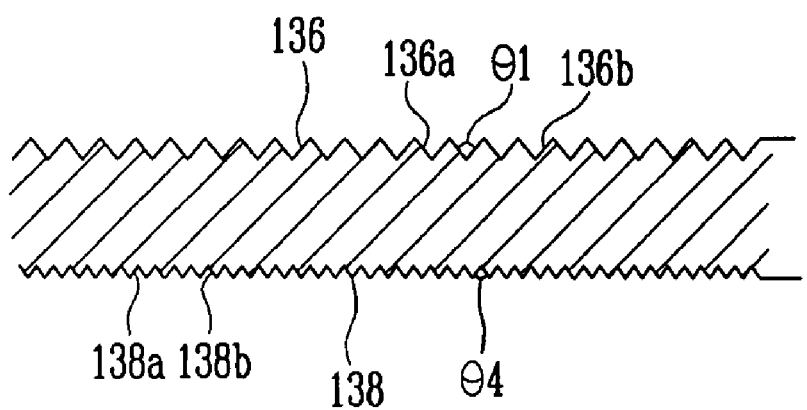
FIG. 2B illustrates a cross-sectional view of the exemplary light guide member illustrated in FIG. 2A, taken along line A-A' of FIG. 2A.
Figure 2C:
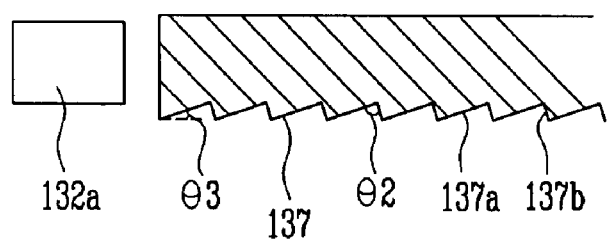
FIG. 2C illustrates a cross-sectional view of the exemplary light guide member illustrated in FIG. 2A, taken along the line B-B' of FIG. 2A.
Figure 2D:
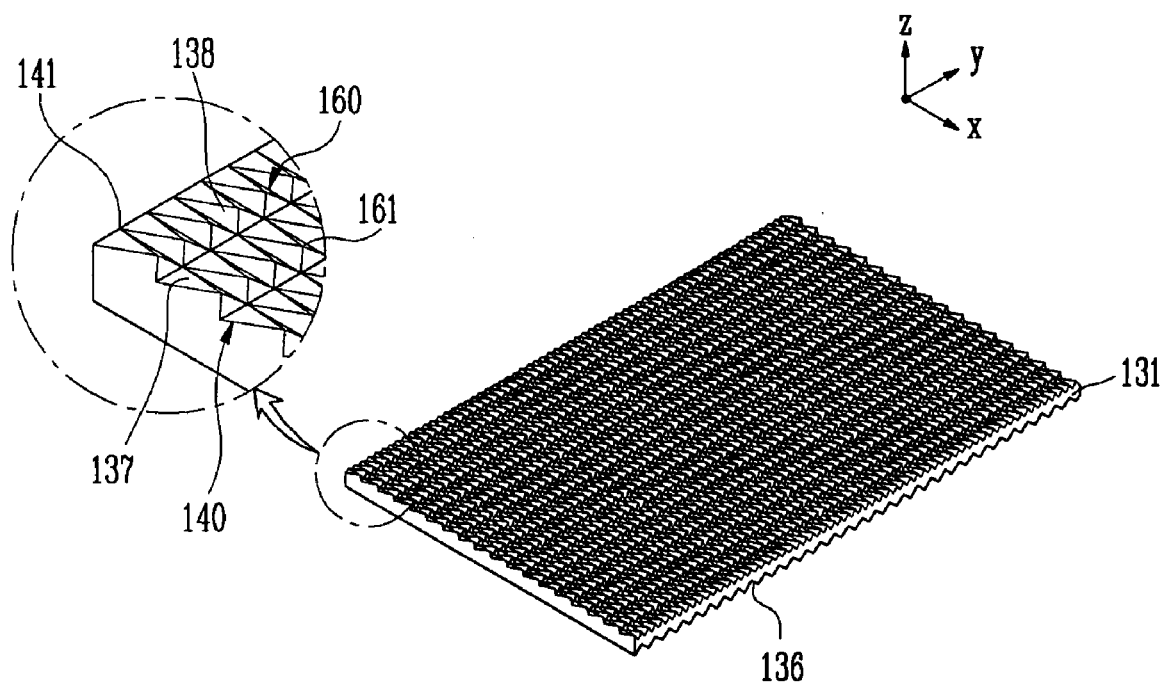
FIG. 2D illustrates a bottom-side view of the exemplary light guide member illustrated in FIG. 2A, as viewed from a direction of arrow C of FIG. 2A.

FIG. 2A illustrates a top-side perspective view of an exemplary embodiment of a light guide member employing one or more aspects of the invention, FIG. 2B illustrates a cross-sectional view of the exemplary light guide member illustrated in FIG. 2A, taken along line A-A' of FIG. 2A, FIG. 2C illustrates a cross-sectional view of the exemplary light guide member illustrated in FIG. 2A, taken along the line B-B' of FIG. 2A, and FIG. 2D illustrates a bottom-side view of the exemplary light guide member illustrated in FIG. 2A, as viewed from a direction of arrow C of FIG. 2A including an enlarged view of a circled portion of the exemplary light guide member as illustrated in FIG. 2D.

Referring to FIGS. 2A to 2D, the second grooves 137 may extend along a first direction, e.g., x-direction, on the first side 151 of the light guide member 131. The first direction may be substantially perpendicular to a zero-degree radiation angle of light emitted from the light source(s) 132a. The third grooves 138 may extend along the second direction, e.g., y-direction, on the first side 151 of the light guide member 131. The second direction may be substantially parallel to the zero-degree radiation angle of light emitted from the light source(s) 132a and/or substantially perpendicular to the first direction, e.g., x-direction. The first grooves 136 and the second grooves 137 may extend along directions that are substantially orthogonal to each other. The first grooves 136 and the third grooves 138 may extend along directions that are substantially parallel to each other. When light is provided to one or more sides, e.g., the third side 153, of the light guide member 131, an optical path and distribution of the received light may be changed by the first, second and/or third grooves 136, 137, 138. In embodiments of the invention, the direction(s) along which each of the first, second and third grooves 136, 137, 138 extend are not limited to the arrangement(s) illustrated in the accompanying Figures.

The first grooves 136, the second grooves 137 and/or the third grooves 138 may be substantially V-shaped grooves. More particularly, in embodiments of the invention, irrespective of a depth and/or a width of the first grooves 136, the second grooves 137 and/or the third grooves 138, a cross-sectional shape of the first grooves 136, the second grooves 137 and/or the third grooves 138 may be substantially V-shaped, as taken along a line extending along the second direction and/or along the first direction, respectively. Embodiments of the invention are not limited to such structures. For example, the first grooves 136 may be formed on the second side 152 of the light guide member 131, and the second grooves 137 and the third grooves 138 may be formed on the first side 151 of the light guide member 131.

Referring to FIG. 2B, a vertical angle θ1 formed by inner sides 136a, 136b first grooves 136 may be about 85° to about 120°. The vertical angle θ1 of the first grooves 136 may play an important role in the uniformity of the luminance distribution of light provided by the light guide member 131, and thereby, may play an important role in the image quality of image(s) displayed on a display panel. When the vertical angle θ1 of the first grooves 136 is less than about 85°, directional uniformity of the light may be easily controlled. However, in such cases, bright lines/areas and/or dark areas may be produced, and a luminance distribution may be hindered. When the vertical angle θ1 of the first grooves 136 is greater than about 120°, the luminance distribution of the light may be substantially and/or completely uniform. However, in such cases, the directional uniformity of the light may be difficult to control.

In embodiments of the invention, a cross-sectional shape of the first grooves 136, taken along a line extending, e.g., along the second direction, may be an isosceles triangle. The first grooves 136 may be arranged at regular intervals.

Referring to FIG. 2C, a vertical angle θ2 formed by inner sides 137a, 137b of the second grooves 137 may be about 130° to about 150°. An angle θ3 formed by one of the inner sides, i.e., 137a, which is closer to the third side 153, and a plane extending along the x and y directions, e.g., x-y plane, may be about 1° to about 3°. That is, the angle θ3 may correspond to the angle between the inner side, e.g., 137a, of the second groove closer to the light source 132a. In embodiments of the invention, the inner side, i.e., 137a, forming the angle θ3 relative to the x-y plane may have a length that is longer than a length of the other of the inner sides, i.e., 137b. The second grooves 137 may be arranged at regular intervals. There are no limitations on depth, width and pitch of the second grooves 137.

Referring to FIG. 2B, a vertical angle θ4 formed by made by two inner sides 138a, 138b of the third grooves 138 may be about 120° to about 160°. In embodiments of the invention, a cross-sectional shape of the third grooves 138, taken along a line extending, e.g., along the first direction, may be an isosceles triangle. In embodiments of the invention, the third grooves 138 may have substantially a same depth, width and/or pitch as the first grooves 136. However, embodiments of the invention are not limited to such structures. That is, in embodiments of the invention, the third grooves 138 may have a different depth, width and/or pitch relative to a depth, width and/or pitch of the first grooves 136.

Table 1 provides exemplary depth, width, pitch and vertical angle values for each of exemplary first grooves 136, second grooves 137 and third grooves 138 for an exemplary embodiment of a light guide member employing one or more aspects of the invention. Table 1 only provides exemplary values, and embodiments of the invention are not limited to the exemplary values provided therein.

TABLE 1

|  | First Grooves | Second Grooves | Third Grooves |
|---|---|---|---|
| Depth (μm) | 7.67 | 4 | 6 |
| Width (μm) | 20 | 121.5 | 68.5 |
| Pitch (μm) | 30 | 121.5 | 68 |
| Angle (°) | 105 | 148 | 160 |

Referring to FIG. 2D, the second grooves 137 may intersect the third grooves 138 and may form a matrix like pattern with a plurality of cell-like portions on the first side 151 of the light guide member 131. A projecting polygonal-like pattern, e.g., a pyramid-like pattern 160, may be formed at each of the cell-like portions on the first side 151 of the light guide member 131. In embodiments of the invention, the pyramid-like patterns 160 may have a pointed edge 161 corresponding to a meeting of outer edges of the second and third grooves 137, 138. Adjacent ones of the pyramid-like patterns 160 may share common boundary portions corresponding to respective base portions of the second grooves 137 and third grooves 138. For example, adjacent ones of the pyramid-like patterns 160 along the first direction, e.g., x-direction, may share a common boundary portion corresponding to a base 140 of the second grooves 137, and adjacent ones of the pyramid-like patterns 160 along the second direction, e.g., y-direction, may share a common boundary portion corresponding to a base 141 of the third grooves 138.

Figure 3:
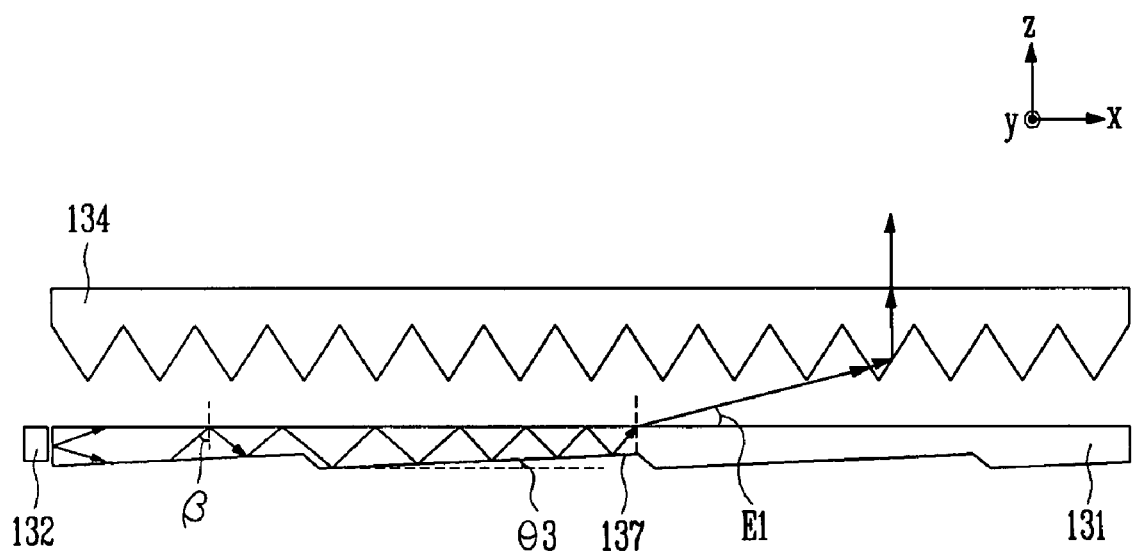
FIG. 3 illustrates a general cross-sectional view of an exemplary light guide member and an optical member employing one or more aspects of the invention.

FIG. 3 illustrates a general cross-sectional view of an exemplary light guide member and an optical member employing one or more aspects of the invention. An exemplary operation of the light guide member 131 is described below with reference to FIGS. 2 and 3. Light may be emitted from the light source unit 132 toward the light guide member 131. For example, light from the light source unit 132 may be emitted toward the first side 151 of the light guide member 131. The light from the light source unit 132 may then be completely or substantially completely reflected and guided to the LCD panel 100 via the light guide member 131 employing one or more aspects of the invention. If the incident light has an angle greater than a predetermined critical angle, the incident light may exit via the first side 151 of the light guide member 131.

In embodiments of the invention, an exit angle E1 of the light from the second side 152 of the light guide member 131 may be about 74° to about 76° relative to a plane extending along the first and second directions, e.g., x-y plane. As illustrated in FIGS. 2 and 3, the second side 152 of the light guide member 131 may face an optical member 134, which may include, e.g., an inverse prism sheet. When an exit angle of the light output from the light guide member 131 is about 74% to about 76% relative to, e.g., the x-y plane, light may exit from the optical member 134, e.g., inverse prism sheet, at an exit angle of about 0° to about 2° relative to a third direction, e.g., z-direction. The third direction may be substantially perpendicular to the first and second directions. Referring to FIG. 3, the exit angle E1 of light of the light may be dependent on an incidence angle β.

As discussed above, in embodiments of the invention, the vertical angle θ2 formed by two inner sides 137a, 137b may be about 130° to about 150°, and the angle θ3 formed by one of the inner sides, i.e., 137a, which is closer to the third side 153, and a plane extending along the x and y directions, e.g., x-y plane, may be about 1° to about 3°. That is, the angle θ3 may correspond to the angle between the inner side, e.g., 137a, of the second groove 137 closer to the light source 132a. As a result, when light incident on the light guide member 131 is reflected by the first side 151 for the $N^{th}$ time, the incidence angle β' may be increased to β+N*θ3.

Thus, in embodiments of the invention, each time the incident light is reflected, the incidence angle may be increased by θ3, and when the incidence angle is larger than the predetermined critical angle, the incidence light may exit from the second side 152 of the light guide member 131 with a certain angle.

In embodiments of the invention, the shape of the third grooves 138 and the shape of the second grooves 137 may help concentrate light incident thereon, and may help reduce spreading of the light to help the luminance distribution of light output from the light guide member 131. As a result, embodiments of the invention may provide light guide member(s) capable of outputting light having a substantially uniform and/or completely uniform luminance distribution and a substantially uniform and/or completely uniform direction. Thus, bright areas/lines and/or dark areas on the luminance distribution of light emitted from light guide members employing one or more aspects of the invention may be reduced and/or prevented.

Table 2 compares a luminance distribution of a conventional BLU with a luminance distribution of a backlight unit including a light guide member employing one or more aspects of the invention.

TABLE 2

|  | Luminance | Increasing rate of the luminance |
|---|---|---|
| Conventional BLU | 5,698 cd/m² | 1 |
| Exemplary BLU including light guide member employing one or more aspects of the invention. | 10,000~11,000 cd/m² | 1.75~1.92 |

In the comparative example above, the conventional BLU included a light guide member with conventional diffusive patterns formed thereon, two prism sheets and diffusing sheets. The exemplary BLU employing one or more aspects of the invention employed a light guide member including intersecting grooves, e.g., second and third grooves 137, 138, on one side thereof, and an optical member including only a prism sheet.

In accordance with Table 2, the luminance of the light guide member according to the exemplary embodiment of the invention is higher than that of the conventional light guide member.

Aspects of the invention are described above with reference to exemplary embodiments, however, modifications and variations thereof may be made without departing from the spirit and scope of the invention. For example, the angle of each pattern, depth of the pattern, width can be changed. Furthermore, persons skilled in the art appreciate that the various modifications and changes of the constitution of the backlight unit comprising the light guide member described with the embodiment of the invention can be made.

As described above, light guide member(s) and BLUs employing one or more aspects of the invention enable light having a more uniform and/or completely uniform luminance distribution and more uniform and/or completely uniform directionality to be output from the light guide member. By providing light guide members and BLUs including, e.g., intersecting grooves forming pyramid-like patterns on a same side of the light guide member, the luminance distribution and directional uniformity of the light emitted from the light guide member may be improved relative to conventional light guide members and BLUs. Thus, e.g., when light guide members are employed in display device, embodiments of the invention may help improve brightness of the display by maximizing the reflective characteristics of light incident on the light guide member.

Embodiments of the invention separately enable lighter, thinner and/or smaller sized BLUs relative to conventional BLUs by, e.g., reducing and/or eliminating a need for diffusion sheets in an optical member of the BLU.

Although exemplary embodiments of the light guide member and the backlight unit may be described in relation to an exemplary LCD device, embodiments of the invention are not limited to use with an LCD device. Further, although reference is made to a "backlight unit" as an exemplary illumination device, such units are generally called "backlight" units because they may be arranged behind the display panel. However, aspects of the invention are not limited to such arrangements and/or uses.

Exemplary embodiments of the invention have been disclosed herein, and although specific terms are employed, they are used and are to be interpreted in a generic and descriptive sense only and not for purpose of limitation. For example, while V-grooves have been illustrated in embodiments of the invention, an angle formed between the light and the wave pattern may be more important than the shape of the groove itself. While a V-groove may be the most efficient manner to realize the appropriate wave pattern, the groove may, e.g., be curved or have a flat base, rather a V shape. Accordingly, it will be understood by those of ordinary skill in the art that various changes in form and details may be made without departing from the spirit and scope of the invention as set forth in the following claims.

What is claimed is:

1. A light guide member for guiding light incident thereon from a light source, the light guide member comprising:
a plurality of first grooves extending along a first direction on a first side of the light guide member; and
a plurality of second grooves extending along a second direction on the first side of the light guide member, the second direction being different from the first direction, wherein:
a vertical angle formed by two inner sides of the first grooves is about 130° to about 150°, and
the first direction is substantially perpendicular to a zero-degree radiation angle of light emitted from the light source, wherein the first grooves each have two inner sides, and one of two inner sides is longer than the other of the two inner sides.

2. The light guide member as claimed in claim 1, further comprising a plurality of third grooves extending along a third direction on a second side of the light guide member.

3. The light guide member as claimed in claim 2, wherein a vertical angle formed by two inner sides of the third grooves is about 85° to about 120°.

4. The light guide member as claimed in claim 1, wherein an angle formed by an inner side of each of the first grooves that is closer to the light source and a plane extending along the first and second directions is about 1° to about 3°.

5. The light guide member as claimed in claim 1, wherein a vertical angle formed by two inner sides of the second grooves is about 120° to about 160°.

6. The light guide member as claimed in claim 1, wherein the first direction is orthogonal to the second direction.

7. The light guide member as claimed in claim 2, wherein the second direction is parallel with the third direction.

8. A light guide member for guiding light incident thereon from a light source, the light guide member comprising:
a plurality of first grooves extending along a first direction on a first side of the light guide member;
a plurality of second grooves extending along a second direction on the first side of the light guide member, the first direction crossing the second direction such that the first grooves and the second grooves form a matrix pattern defining a plurality of same shaped regions on the first side of the light guide member, wherein the plurality of substantially same shaped regions may include polygonal shaped projections formed between corresponding ones of the first grooves and second grooves, wherein:
a vertical angle formed by two inner sides of the first grooves is about 130° to about 150°, and
the first direction is substantially perpendicular to a zero-degree radiation angle of light emitted from the light source, wherein an angle formed by an inner side of the first grooves closer to the light source and a plane extending along the first and second directions is about 1° to about 3°.

9. The light guide member as claimed in claim 8, wherein the first direction is perpendicular to the second direction.

10. The light guide member as claimed in claim 8, wherein a vertical angle formed by two inner sides of the second grooves is about 120° to about 160°.

11. The light guide member as claimed in claim 8, further comprising a plurality of third grooves on a second side of the light guide member, wherein the second side opposes the first side and the third grooves extend along a third direction.

12. The light guide member as claimed in claim 8, wherein the polygonal shaped projections are pyramid-like shaped projections.

13. A backlight unit (BLU) employable by a display device including a display panel, the backlight unit comprising:
a light source;

an optical member; and a light guide member arranged to receive light from the light source and provide the guided light to the optical member, the light guide member including:
- a plurality of the first grooves extending along a first direction on a first side of the light guide member,
- a plurality of second grooves extending along a second direction on a second side of the light guide member, the second direction being different from the first direction, and
- a plurality of third grooves extending along a third direction on the second side of the light guide member, the third direction being different from the second direction, wherein:

an angle formed by an inner side of second grooves the closer to the light source and a plane extending along the second and third directions is about 1° to about 3°, a vertical angle formed by two inner sides of the second grooves is about 130° to about 150°, the second direction is substantially perpendicular to a zero-degree radiation angle of light emitted from the light source.

14. The BLU as claimed in claim 13, wherein the light source includes at least one of a cold cathode fluorescent tube and a LED.

15. The BLU as claimed in claim 13, wherein the optical member only includes a prism sheet.

16. The BLU as claimed in claim 13, wherein the optical member does not include a diffusion sheet.

17. The BLU as claimed in claim 13, wherein the first direction is substantially parallel to the third direction, and the first and third directions are substantially parallel to the zero-degree radiation angle of light emitted from the light source.

* * * * *